United States Patent [19]

Pardillos

[11] Patent Number: 5,642,482
[45] Date of Patent: Jun. 24, 1997

[54] SYSTEM FOR NETWORK TRANSMISSION USING A COMMUNICATION CO-PROCESSOR COMPRISING A MICROPROCESSOR TO IMPLEMENT PROTOCOL LAYER AND A MICROPROCESSOR TO MANAGE DMA

[75] Inventor: Jacky Pardillos, Plaisir, France

[73] Assignee: Bull, S.A., Puteaux, France

[21] Appl. No.: 284,671

[22] PCT Filed: Dec. 21, 1993

[86] PCT No.: PCT/FR93/01286

§ 371 Date: Aug. 22, 1994

§ 102(e) Date: Aug. 22, 1994

[87] PCT Pub. No.: WO94/15295

PCT Pub. Date: Jul. 7, 1994

[30] Foreign Application Priority Data

Dec. 22, 1992 [FR] France ................... 92 15521

[51] Int. Cl.⁶ ........................................ G06F 3/00
[52] U.S. Cl. ........................ 395/200.2; 395/200.15; 364/229; 364/232.22; 364/239.9; 364/242.3
[58] Field of Search .................. 364/240.8, 940.81, 364/222.2, 284, 284.4, 229, 232.22, 239.9, 242.3; 395/200.2, 831, 200.08, 200.21, 200.15

[56] References Cited

U.S. PATENT DOCUMENTS

| | | | |
|---|---|---|---|
| 4,430,699 | 2/1984 | Segarra et al. | 364/200 |
| 5,151,899 | 9/1992 | Thomas et al. | 370/94.1 |
| 5,237,693 | 8/1993 | Kiyohara et al. | 395/725 |
| 5,278,834 | 1/1994 | Mazzola | 370/94 |
| 5,434,976 | 7/1995 | Tan et al. | 395/200 |
| 5,459,720 | 10/1995 | Iliev et al. | 370/60 |

FOREIGN PATENT DOCUMENTS 0410860  1/1991  European Pat. Off. .

OTHER PUBLICATIONS

Computer Communications Review—SIGCOMM'88 Symposium: Communications, Architectures and Protocols, vol. 18, No. 4, Aug. 1988, NY,NY,US, pp. 175–187, H. Kanakia et al., "The VMP Network Adapter Board (NAB): High--Performance Network Communications for Multiprocessors".

IEEE Network, vol. 4, No. 2, May 1991, NY, US, pp. 14–22, T. F. Laporta et al., "Architectures, Features and Implementation of High–Speed Transport Protocols".

*Primary Examiner*—Thomas C. Lee
*Assistant Examiner*—Ki S. Kim
*Attorney, Agent, or Firm*—Kerkam, Stowell, Kondracki & Clarke, P.C.; Edward J. Kondracki

[57] ABSTRACT

A system for transmitting data (NCC) between a computer bus (PSB) and a network (RE), including (1) a general purpose unit (GPU) connected to the bus and to a network-connected adapter, and including a first microprocessor and a unit for transferring frames between the bus and the adapter, and vice versa, comprising a dual port memory connected therebetween; and (2) a communication coprocessor (PPA) connected to the general purpose unit (GPU). Said coprocessor (PPA) includes a second microprocessor ($CPU_3$) implementing, for each communication layer ($C_2$–$C_4$), the corresponding protocol by providing each frame with control data adapted to said protocol, said second microprocessor being connected to the first microprocessor and the memory; and a third microprocessor ($CPU_4$) providing direct memory access management of data transfer between the second microprocessor ($CPU_3$) and the memory (VRAM).

10 Claims, 4 Drawing Sheets

SYSTEM FOR NETWORK TRANSMISSION USING A COMMUNICATION CO-PROCESSOR COMPRISING A MICROPROCESSOR TO IMPLEMENT PROTOCOL LAYER AND A MICROPROCESSOR TO MANAGE DMA

FIELD OF THE INVENTION

The present invention relates to a system for transmission of data between a computer bus and a network. It is more particularly applicable to a fiber distribution data interface (FDDI) type data transmission network whose transmission medium is constituted of fiber optics (standardized by American National Standard Institute, ANSI, under the reference number X3D9-5, and by the International Standards Organization, ISO).

BACKGROUND OF THE INVENTION

Communications networks are constituted by a plurality of terminals or stations linked to one another by a transmission link (whose transmission medium is constituted of fiber optics, in the case of an FDDI-type network). A computer linked to such a network is considered to be a terminal.

Many modern networks are known which function according to the same reference model. The best-known are the Open System Interconnection (OSI) or Transmission Control Protocol/Internet Protocol (TCP/IP) reference models. These models are similar relative to the definition of the architecture of these networks in the form of standardized layers. Thus in the OSI model, there are 7 different activity layers, with the lowest layer (layer 1) corresponding to the physical transmission of signals, while the highest layer corresponds to the functions executed by the application programs and the users of the network in question.

Furthermore, within a network, the information messages emitted by the various stations are constituted by a plurality of frames. Every frame is constituted of usable data framed in time by control characters located at its head and foot.

The trend in technological development of networks, along with the utilization of more and more terminals, leads to developing programmed communications processors whose purpose is to reduce the load on the central processing unit by executing part of the management of its communications with the other stations in the network.

In addition, the extremely rapid development of communications networks and information processing systems leads to connecting computers of different types using different operating systems in the same network.

The object of a communications processor, which is also called a data transmission system, is to adapt the conditions for transmission of information in the bus of the computer to which it is associated, to the transmission conditions in the network, these transmission conditions being totally different. Furthermore, this data transmission system allows the different computer operating systems to dialogue with one another. In particular, it allows the various communications layers of the operating system of a first computer to dialogue with the various communications layers of the operating systems of other computers connected to the same network.

For example, one such communications processor is known, which is also called a data transmission system. Such a processor has the simplified architecture shown in FIG. 1. This type of architecture is described for example in the French Patent Application No. 92 13653 (corresponding to U.S. Ser. No. 08/143,130), filed by the present applicant Nov. 13, 1992 under the title "Outil de simulation d'un code de réseau" ["Tool for simulating a network code"].

Such a communications processor, known as a Network Communication Controller (NCC), makes it possible to assure the management of the data transfer between a computer HOST, equipped with an internal bus PSB and whose operating system is designated by OS, and a network RE, for example of the FDDI type. The bus PSB is for example a bus known as MULTIBUS II (trademark registered by INTEL) which is standardized by IEEE Standard 1296 (Institute of Electrical and Electronic Engineers).

The communications processor NCC comprises the following three essential parts:

the first part, called GPU (acronym for General Purpose Unit), is for example the model described in patent application No. 91 08908 (corresponding to U.S. Ser. No. 07/913,477) which BULL S. A. filed on Jul. 15, 1991, under the title "Dispositif universel de couplage d'un bus d'ordinateur à un contrôleur d'un groupe de périphériques" ["Universal device for coupling a computer bus with a controller of a group of peripherals"]. This part is equipped with an operating system, for example the type described in the patent application No. 91 08907 (corresponding to U.S. Ser. No. 07/913, 366) filed by the same applicant on the same day as the preceding, under the title "Système d'exploitation pour dispositif universel de couplage d'un bus d'ordinateur à une liaison spécifique d'un réseau" ["Operating system for a universal device for coupling a computer bus to a specific link of a network"]. The object of this part GPU is to assure the initialization of the coupler assembly NCC on one hand, and to assure the dialogue with the computer HOST by means of the bus PSB on the other hand, while complying with the operating standards of this bus and conforming to the nature of the operating system OS of the computer HOST. In addition, the part GPU assures the physical transfer of data between the bus PSB and the second part Device Adapter (DEA), which can be called an adapter device, which is directly connected to the network RE. The function of this part DEA is described below.

The part DEA is for example either the type described in the French patent No. 2 650 412 (corresponding to U.S. Pat. No. 5,237,659) whose title is "dispositif passerelle de connexion d'un bus d'ordinateur à un réseau fibre optique en forme d'anneau" ["Bridge device for connecting a bus with a fiber optic network in ring form"], in terms of the hardware, or that described in the patent application No. 92 11054 (corresponding to U.S. Ser. No. 08/121,295), in terms of the software. This part DEA assures the physical transmission of data between the part GPU and the network RE, as well as the physical connection to the network.

The third part, called Protocol Processing Attachment (PPA), is in fact a communications coprocessor that is more specifically intended for managing the various telecommunications layers in the OSI model, or in the TCP/IP model. As far as both the OSI model and the TCP/IP model are concerned, the part PPA assures the management of the communications layers C4, C3, C2, which are the transport, network, and data link layers, respectively.

The communications layers C2 through C4 communicate with one another by means of primitive functions which permit two adjacent layers to dialogue with one another.

Thus the two layers C2 and C3 communicate with one another by means of the set of functions ST2, while the layers C3 and C4 communicate by means of the set of functions ST3. In addition, C4 communicates with the outside world, that is, with external applications for example, by means of an interface SH.

In a preferred embodiment of the invention, the sets of functions ST2, ST3, SH are functions that are known in current practice as STREAMS. These standard functions are defined for example in the following documents:

Unix System V, Release 4—STREAMS Programmer's Guide, ATT issue 1.

Unix System V, Release 3.2—STREAMS Programmer's Guide, ATT (ISBN: 0-13-944810-1): 1989.

In the exemplary embodiment shown in FIG. 1, when the computer HOST sends a message to the network RE, or when a message originates in the network RE, it passes through to the layers C2 through C4 of PPA by means of a first in first out (FIFO) memory, namely $FF_1$ or $FF_2$, depending on whether this message is transmitted to DEA or to GPU respectively. When this involves performing a log-on that originates from the computer HOST, this log-on passes through the interface SH, while once the connection is established, when it involves sending messages to all or some of the stations connected to the network, these messages pass directly to the layers C4 through C2.

The layers C2 through C4 and the various functions ST2, ST3, and SH, as well as the operating system of the part PPA, constitute the communications layer code CC which is used by the communications coprocessor PPA.

The essential role of the communications coprocessor PPA is to relieve the host system of the management of communications layers that it normally executes, while retaining extremely high performance in the communications processor NCC, in terms of the data transmission speed to or from the network.

The present invention relates to a particularly advantageous mode of embodiment of the communications coprocessor PPA which makes it possible to obtain precisely the performance required in terms of speed.

According to the invention, the system for transmission of data between a computer bus and a network includes:

1. A universal coupling device linked to the bus which communicates by means of an interface with an adaptor device connected to the network,
   the universal device including:
      a first microprocessor associated with a first memory which runs an operating system contained within this memory,
      means for the transfer of frames from the bus to the adapter device and vice versa, which includes a dual port memory disposed between the bus and the adapter
   device, and which is connected to the latter by means of a second bus, 2. A communications coprocessor linked to the universal coupling device for managing at least the transport, network, and data link layers,
   is characterized in that the coprocessor includes:
      a second microprocessor which implements the communications protocol corresponding to each layer while providing each frame with control data conforming to this protocol, its data bus being connected to the second bus and its control bus being connected to the internal bus of the first microprocessor,
      a third microprocessor which manages the transfer of data between the second microprocessor and the dual port memory by means of direct memory access.

BRIEF DESCRIPTION OF THE DRAWINGS

Other characteristics and advantages of the present invention will become apparent in the following description, given as a non-limiting example, and in reference to the appended drawings.

In these drawings.

DETAILED DESCRIPTION OF THE PREFERRED EMBODIMENTS

Figure 1:
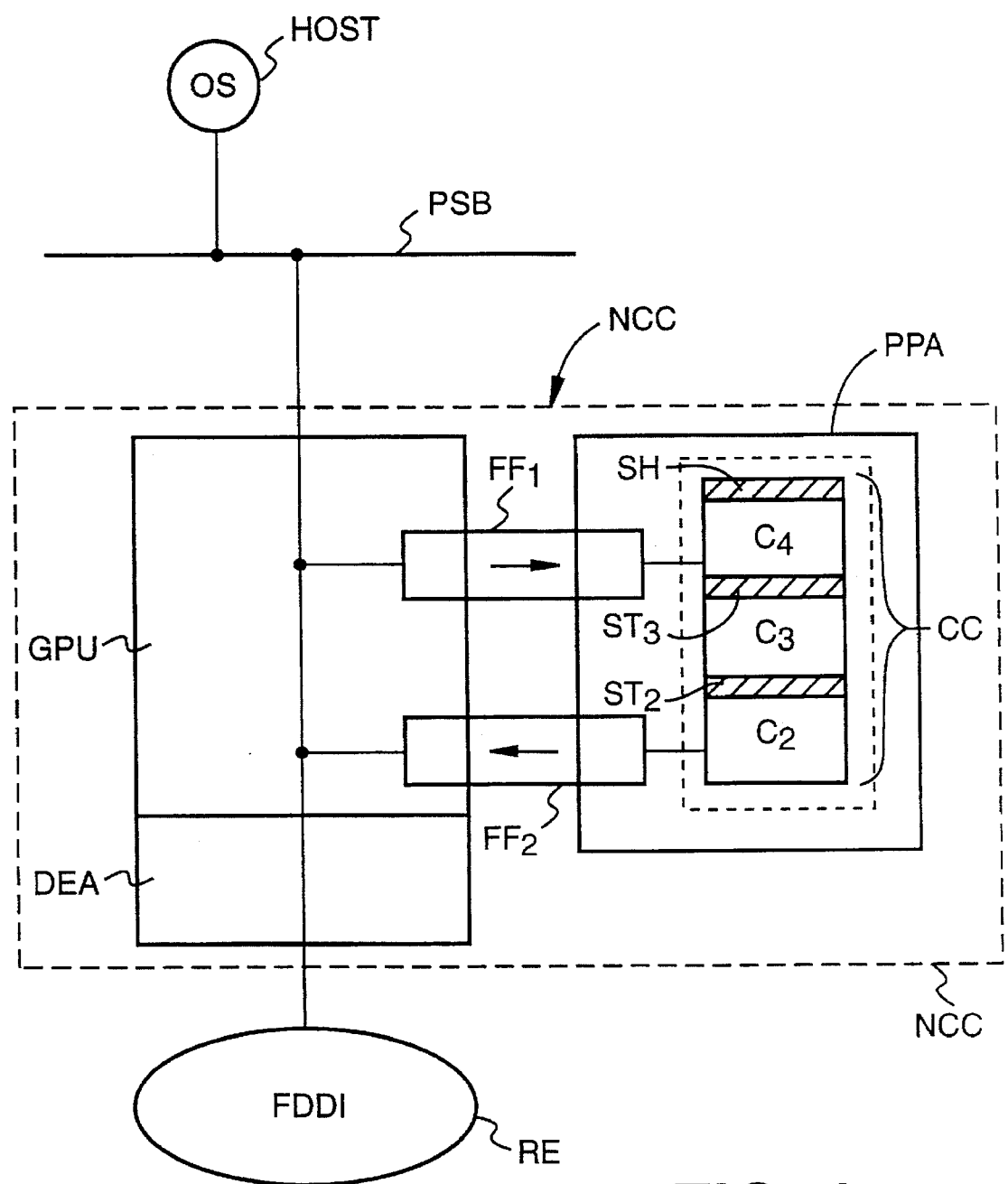
FIG. 1 shows the various essential constituent elements of a communications processor.
Figure 2:
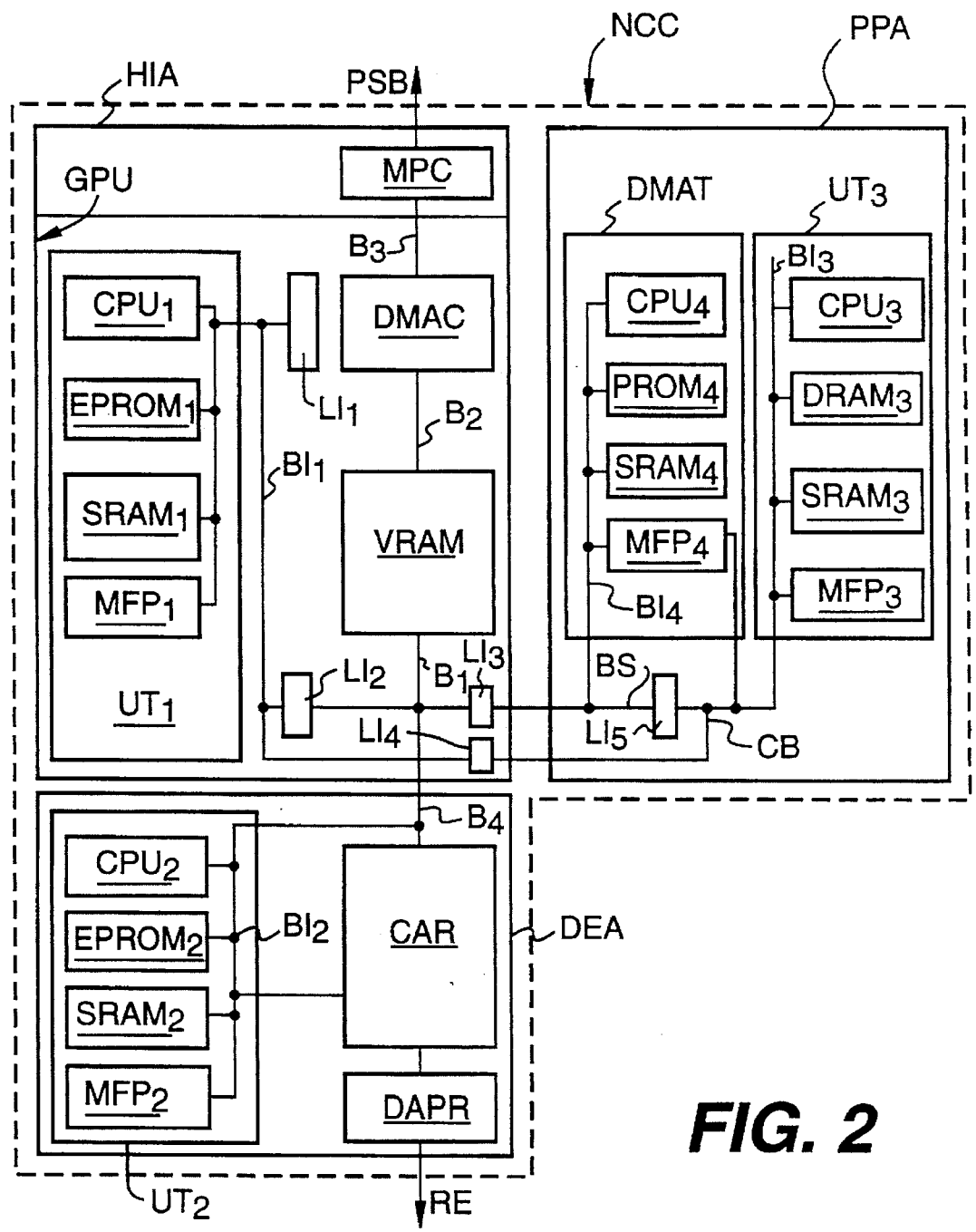
FIG. 2 shows in more detail each of the essential constituent parts of the communications processor in FIG. 1.

FIG. 2, which shows the constituent elements of each of the essential parts which compose the communications processor NCC, will now be examined.

First, the universal coupling device GPU which is described in more detail in the aforementioned patent application No. 91 08908, will be examined. Here, this examination will be limited to defining in a very general way the role of each of the elements which constitute it.

These elements are:

The processing unit UT1, itself composed of the following sub-elements:

The microprocessor $CPU_1$ which actually constitutes the central processing unit of the device GPU. It is equipped with an internal bus $BI_1$ for transporting the commands intended for the adaptor device DEA. This microprocessor is associated with an erasable programmable memory $EPROM_1$, a static random access memory $SRAM_1$, and an interrupt manager $MFP_1$. $EPROM_1$, $SRAM_1$, and $MFP_1$ are all connected to $BI_1$.

The Video-RAM-type dual port memory designated by the symbol VRAM.

The direct memory access controller DMAC, connected to the bus $B_2$ linking it to the memory VRAM on one hand, and to the bus $B_3$ linking it to the part host adapter HIA formed from the coprocessor MPC, which is itself linked to the bus PSB, on the other hand. This part HIA, which can also be called the host adaptor, depends on the nature of the internal bus of the host HOST. In the case where the bus is a MULTIBUS II-type bus, the coprocessor MPC is for example the VN82c389 type manufactured by INTEL.

The bus $B_1$ which links the memory VRAM to the adaptor device DEA.

The microprocessor $CPU_1$, in the example described here, is a 68030 type microprocessor manufactured by the firm MOTOROLA.

The erasable read-only memory $EPROM_1$ contains the self-test and initialization programs of GPU.

The memory SRAM contains the operating system of $CPU_1$, which is responsible for the initialization of GPU.

The operating system of the microprocessor $CPU_1$ is for example the type described in the aforementioned patent application No. 91 08907.

The direct access controller DMAC is serially connected between the memory VRAM and the coprocessor MPC on one hand, and between the coprocessor MPC and the bus $BI_1$ of $CPU_1$ on the other hand.

A detailed description of this controller DMAC is given in French Patent Application No. 91 15814 (corresponding to U.S. Ser. No. 08/244,892), filed by the present applicant Dec. 19, 1991 under the title "Contrôleur de transferts multiples de données entre une pluralité de mémoires et un bus d'ordinateur" ["Controller of multiple data transfers between a plurality of memories and a computer bus"].

The device GPU further includes one logical exclusion device $LI_1$ disposed between DMAC and $BI_1$ and another logical exclusion device $LI_2$ disposed between the bus $B_1$ and the bus $BI_1$. These exclusion devices make it possible to prevent the usable data originating from the host HOST and intended for the network RE from passing through the internal bus $BI_1$ of the microprocessor $CPU_1$, which makes it possible to avoid a reduction in this microprocessor's performance.

The microprocessor $CPU_1$ is not only the brain of the coupling device GPU but also the brain of the communications processor NCC: It initializes the data transfers, implements its operating system, and transfers the usable data between HOST and DEA and vice versa, while maintaining a dialogue with DEA and PPA respectively, with which it exchanges commands and statuses. It manages in real time not only its own work but also the work of the devices PPA and DEA.

The adaptor device DEA is described in more detail in the aforementioned French patent application No. 92 11054.

The device DEA therefore includes:

A second processing unit $UT_2$ composed respectively of a second microprocessor $CPU_2$ with its internal bus $BI_2$ to which are connected the second erasable programmable memory $EPROM_2$, the memory $SRAM_2$ and the interrupt manager $MFP_2$.

The network access controller CAR.

The device DAPR for physical adaptation to the network.

The processing unit $UT_2$ organizes the transfer of frames between GPU and DEA on one hand, and between GPU and the network RE on the other, and vice versa, while exchanging commands with the first microprocessor $CPU_1$.

The controller CAR for access to the network allows the physical transfer of data from the bus $B_1$ to the network RE via DAPR and the bus $B_4$, which is physically connected to $B_1$.

The way in which the information is transferred between the memory VRAM and the network RE, and the way in which $CPU_1$ and $CPU_2$ dialogue with one another by means of strings of commands disposed in the memory VRAM are described in more detail in the aforementioned patent application No. 92 11054. It describes in particular the software modules disposed in the memory $SRAM_2$, which are independent of one another, and which can communicate with one another on one hand and with the operating system of the microprocessor $CPU_1$ on the other hand by means of a mailbox disposed in the memory $SRAM_2$ and/or by means of strings of commands disposed in the memory VRAM.

The communications coprocessor PPA according to the invention that is shown in FIG. 2 includes:

A processing unit $UT_3$,

A direct memory access device DMAT.

The processing unit $UT_3$ uses the communications code CC under the direction of its own operating system $SE_3$. This operating system may be for example the CNS-A1 type developed and marketed by the Applicant company. The processing unit $UT_3$ will search in the memory VRAM for the usable data transmitted by the host HOST via MPC and DMAC, and add to this data the control characters located at the beginning and end of the frame, each of these control characters conforming to the various communications protocols used respectively in the layers C2 through C4 of the reference models, either OSI, or TCP/IP. The transfer of usable data from the memory VRAM to the processing unit $UT_3$, and from this unit $UT_3$ to the memory VRAM (in the latter case, the usable data are provided with their characters by $UT_3$) is executed by the direct memory access device DMAT.

The processing unit $UT_3$ includes the following fundamental elements:

The third microprocessor $CPU_3$ equipped with its internal bus $BI_3$ to which are connected the dynamic random access memory $DRAM_3$, the read-write memory $SRAM_3$, and the interrupt manager $MFP_3$ respectively.

The third microprocessor CPU3 is for example the 68LC040 type made by MOTOROLA.

The memory $SRAM_3$ is a memory whose capacity is for example 4 megabytes, while the memory $DRAM_3$ has a memory capacity of 16 megabytes.

The interrupt manager $MFP_3$ is for example the same type as the interrupt managers $MFP_1$ and $MFP_2$.

The memory $SRAM_3$ contains the communications code CC, as well as the operating system $SE_3$ of the microprocessor $CPU_3$. Therefore it may be said to be used for processing the protocols of the various layers C2 through C4.

The memory $DRAM_3$ is used to form a plurality of storage locations (buffers) for receiving the frames of usable data which have been received either from the host HOST, or from the network RE, and which are stored in the memory VRAM. These usable data are therefore temporarily stored in the memory $DRAM_3$ while waiting for the microprocessor $CPU_3$ using the communications code CC to furnish them with the necessary control characters to return these frames either to the host HOST or to the network RE, as applicable.

The direct memory access device DMAT includes a microprocessor $CPU_4$, an erasable read-only memory $PROM_4$, an interrupt manager $MFP_4$, and a read-write memory $SRAM_4$, all these elements being connected to the internal bus $BI_4$ of $CPU_4$.

The microprocessor $CPU_4$ is for example the 68LC040 type may by MOTOROLA, while the read-write memory $SRAM_4$ has for example a capacity of 4 megabits and the memory $PROM_4$ has for example a capacity of 256 kilobits. The manager $MFP_4$ is the same 68901 type as the equivalent managers $MFP_1$ through $MFP_3$ of the processing units $UT_1$ through $UT_3$. PROM4 contains the test and initialization programs of the microprocessors $CPU_3$ and $CPU_4$. Upon its initialization, $CPU_4$ transfers those programs related to itself into its associated memory $SRAM_4$ on one hand, and those related to $CPU_3$ into the memory $SRAM_3$ for on the other hand.

As soon as these programs have been implemented by $CPU_3$ and $CPU_4$, it is possible to download, from the host HOST, the functional code of $CPU_4$ into $SRAM_4$ and the functional code of $CPU_3$ into $SRAM_3$, or in other words both $SE_3$ as well as CC.

The two internal buses $BI_3$ and $BI_4$ of the processing unit $UT_3$ and of the direct memory access device DMAT are connected together to the same data bus BS. This data bus is linked to the bus $B_1$ by means of a logical isolation device $LI_3$. In addition, the part of the bus $BI_3$ that is more specifically intended for conveying the commands and for organizing the dialogue between the processing units $UT_1$ and $UT_3$, constitutes a control bus CB which is linked to the internal bus $B_1$ of the unit $UT_1$ by means of the logical isolation device $LI_4$. In addition, $MFP_4$ is also linked to the bus CB.

It will be noted that the processing unit $UT_3$ does not have a PROM type memory and consequently, the microprocessor $CPU_3$ is inhibited each time the memory is cleared. The bus $BI_3$ of the unit $UT_3$ is controlled by either the direct memory access device DMAT or by the microprocessor $CPU_1$. The microprocessor $CPU_3$ of the unit $UT_3$ is released either by one or the other of these two elements DMAT or $CPU_1$.

The microprocessors $CPU_1$ and $CPU_4$ are in command of their own buses. In addition, control of the bus $BI_3$ may be assured by one of the three processors $CPU_1$, $CPU_4$, or $CPU_3$. An arbitration device controls access to the bus of $UT_3$ through one or another of these three microprocessors, depending on the conditions enumerated below. This arbitration device is contained in the unit $UT_3$, in the control bus part of $BI_3$. It is not represented in FIG. 2, for the sake of simplicity. The microprocessor $CPU_3$ obtains the bus $BI_3$ by default if there is no other request from either one of the two microprocessors. $CPU_1$ and DMAT obtain the bus $BI_3$ after arbitration and acknowledgement of their requests to do so. The microprocessor $CPU_1$ has priority over the direct memory access device DMAT.

In summary, for access to the various elements, VRAM, $DRAM_3$, $SRAM_3$, and DMAT, the following elements are in command:

As a reminder, the direct memory access controller DMAC controlled by the microprocessor $CPU_1$ is in command of the access to the memory VRAM from the MULTIBUS II PSB.

The microprocessor $CPU_1$ is in command of the access to the memory VRAM and the two memories $SRAM_3$ and $DRAM_3$, as well as of the control of DMAT. The microprocessor $CPU_3$ is in command of only the access to its associated memories $SRAM_3$ or $DRAM_3$, under the arbitration conditions stated above. The device DMAT is in command of the access to the memory VRAM or to the memories $SRAM_3$ or $DRAM_3$ in the arbitration conditions stated above.

Figure 4:
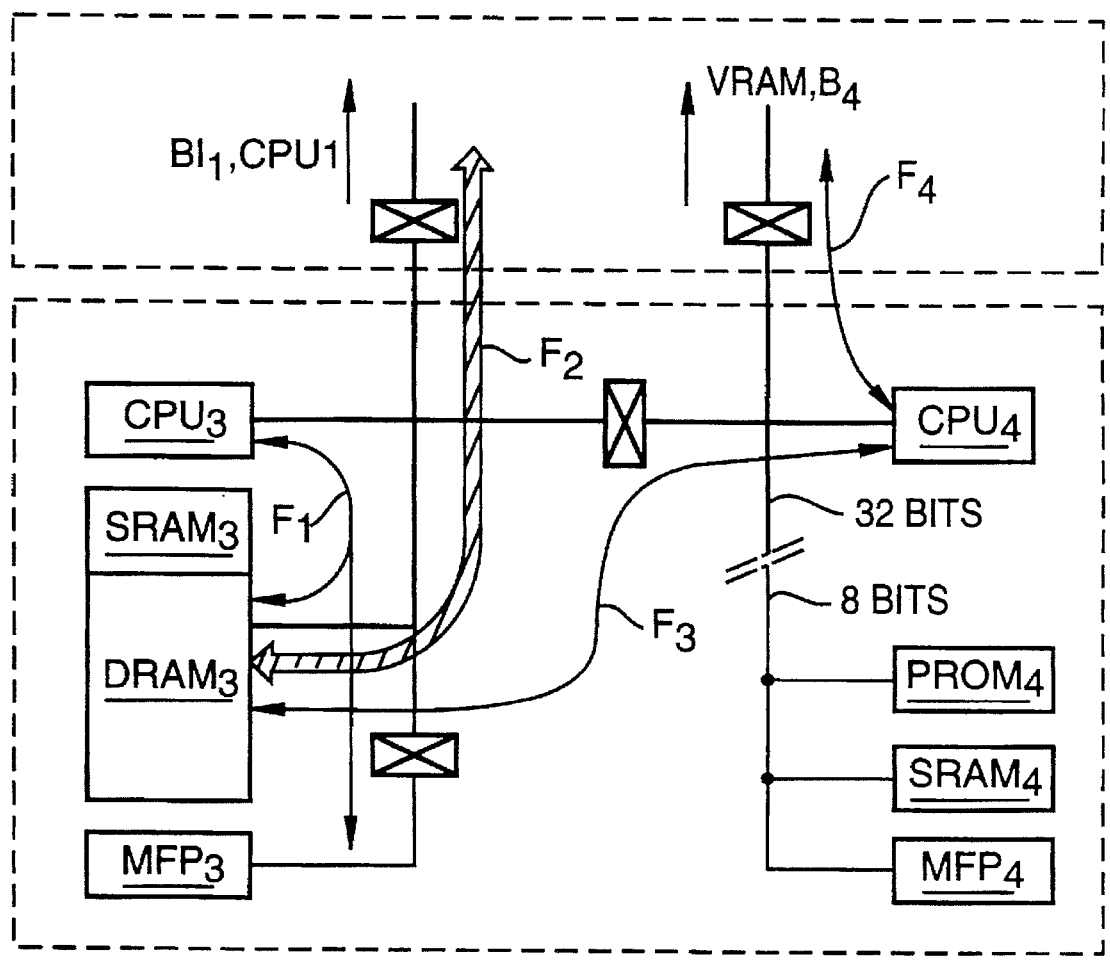
FIG. 4 shows the priority data paths inside the various elements which constitute the communications coprocessor belonging to the communications processor according to the invention.

FIG. 4 summarizes what has been said above. It may be seen in this figure for example that $CPU_3$ has access to two memories $SRAM_3$ and $DRAM_3$ as well as to its interrupt manager $MFP_3$ which is represented by arrow $P_1$. In addition, it may be seen that the microprocessor $CPU_4$ of the direct memory access device DMAT can directly access the memories $SRAM_3$ and $DRAM_3$, as represented by the arrow $F_3$.

Also, an arrow of short slanted dashes $F_2$, which represents the control data path between the microprocessor $CPU_1$ and the memories $SRAM_3$ and $DRAM_3$, may be seen. A double arrow $F_4$ is also drawn, symbolizing the assumption of control of the memory VRAM by the processor $CPU_4$.

Figure 3:
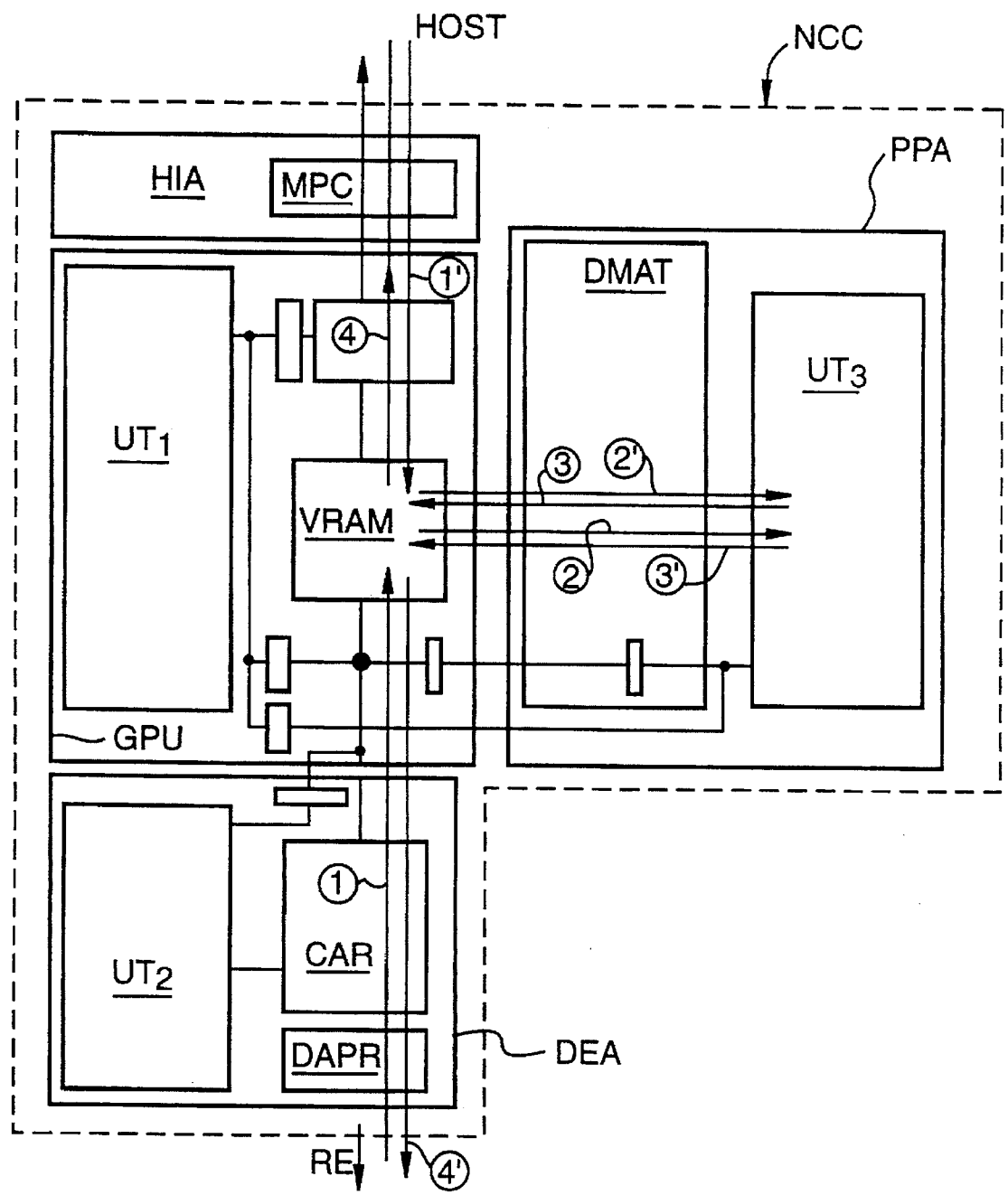
FIG. 3 shows the data paths used for the flow of frames through the various essential constituent elements of the communications processor according to the invention.

FIG. 3, which illustrates the functioning of the assembly constituted by GPU, PPA, and DEA, will now be examined.

It is assumed first of all that frames originating from the network RE are being received. First they run through the adaptation device DEA, that is, the physical adaptation device DAPR, and then they run through the network access controller CAR, in the manner indicated in the aforementioned patent application No. 92 11054; this is symbolized by the arrow 1 in FIG. 3. The data of the frames are momentarily stored in the FIFO memory $FF_2$, a memory located within the memory VRAM. These data are then sent from $FF_2$ to the locations within the memory $SRAM_3$ which are reserved for this purpose. The transfer of data, symbolized by the arrow 2 in FIG. 3, is physically executed by the direct memory access device DMAT, at the direction of the microprocessor $CPU_4$ under the control of the microprocessor $CPU_1$.

The way in which the transfer of these data is executed, through the dialogue between $CPU_1$ and $CPU_4$, is analogous to that which is described for example in one of the patent applications 90 10179 (corresponding to U.S. Pat. No. 5,210,747) and 90 12826 (corresponding to U.S. Ser. No. 07/775,901) filed by the Applicant company respectively on Aug. 8, 1990 and Oct. 17, 1990 under the titles "Contrôleur de communication entre un ordinateur et une pluralité de terminaux de type RNIS" ["Controller of communications between a computer and a plurality of ISDN-type terminals"] and "Contrôleur de communication entre un ordinateur et une pluralité de terminaux appartenant à un réseau de type CSMA/CD" ["Controller of communications between a computer and a plurality of terminals belonging to a CSMA/CD-type network"]. Both of these applications in effect describe the manner in which the transfer of data is executed through the controller of communications between a base, controlled by a first microprocessor, and a peripheral, controlled by a second microprocessor, these first and second microprocessors playing the same role as $CPU_1$ and $CPU_4$ and their associated memories.

Once it has gained access to the memory $SRAM_3$, the microprocessor $CPU_3$ can then execute the processing of the protocols of the layers C2 through C4, using the communications code CC. Consequently, the microprocessor $CPU_3$ changes the control characters located at the head and foot of the frames, which characters conformed to the protocol used in the network RE, into control characters that conform to the protocol of the layers C3 through C4 used between GPU and the computer HOST.

As soon as this processing, which is in fact an adaptation of protocols related to the layers C2 through C4, is executed, the microprocessor $CPU_1$, which is informed of this by the microprocessor $CPU_4$ by means of commands which flow through the bus CB, transfers the thus newly constituted frames of data from the memory $SRAM_3$ to the FIFO memory FF1 contained in the memory VRAM. This is executed under the direction of the direct memory access device DMAT. This transfer is symbolized by the arrow 3 in FIG. 3.

The data which have thus been accessed in $FF_2$ are then dispatched to the computer HOST by a command from the microprocessor $CPU_1$. The physical routing of data is executed by the direct memory access device DMAC in a way that is indicated in the aforementioned French patent application No. 91 15814. This transfer of data between the memory VRAM and the computer MOST via PSB is symbolized by the arrow 4 in FIG. 3.

In order to transfer data between the computer HOST and the network RE, the path travelled by the data is strictly the reverse of the preceding. It is symbolized by the arrows 1', 2', 3', and 4' of FIG. 3. The arrow 1' symbolizes the transfer of data between the host HOST and the memory VRAM under the control of $CPU_1$ by means of the direct memory access device DMAC, and the arrow 2' symbolizes the transfer of data between the FIFO memory $FF_1$ and the memory SRAM$_3$. The data are processed by means of a protocol adjustment in the layers C2 through C4, which is performed by the data processing device UT$_3$. Once this is done, the data are transferred from the memory SRAM$_3$ to the FIFO memory FF$_1$ along the data path 3', then transferred from this FIFO memory to the network RE through the busses B$_1$ and B$_4$ and the elements CAR and DAPR of the adaptor device DEA (arrow 4').

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

I claim:

1. A system (NCC) for transmission of data between a bus (PSB) of a computer (Host) and a network (RE), comprising:

1) a general purpose unit (GPU) linked to the bus (PSB) and an adapter device (DEA) connected to the network, said general purpose unit (GPU) including:

communication means (B$_1$ and B$_4$) for communicating with the adaptor device, a first microprocessor which runs an operating system contained within a first memory (SRAM$_1$), and operatively associated with said first memory by an internal bus (BI$_1$), and a dual port memory (VRAM) for the transfer of frames from the bus (PSB) to the adapter device and vice versa, said dual port memory being disposed between the bus (PSB) and the adapter device and being connected to the adapter device by said communication means;

2) a communications coprocessor (PPA), managing transport, network and data link layers (C2, C3, C4), wherein said coprocessor (PPA) includes:

a second microprocessor (CPU$_3$) which implements a communications protocol corresponding to each layer (C2, C3, C4) while providing each frame of data with control information conforming to said protocol, and has an internal bus (BI$_3$) comprising a data bus (BS) connected to said communication means, and a control bus (CB) connected to said internal bus (BI$_1$) of said first microprocessor, and a third microprocessor (CPU$_4$) which manages the transfer of data between the second microprocessor and the dual port memory by means of direct memory access.

2. The system for transmission according to claim 1, wherein the second microprocessor (CPU$_3$) is connected through the internal bus (BI$_3$) to an associated second memory (SRAM$_3$) which contains a communication code (CC) including said communication layers (C2, C3, C4) communicating with one another using primitive functions (ST2, ST3) and the transport layer communicating with applications outside the system using an interface (SH) operatively connected for communication with the computer (Host).

3. The system for transmission according to claim 2, wherein the third microprocessor (CPU$_4$) controls a third memory (DRAM$_3$), associated with the second microprocessor (CPU$_3$), said third memory including a plurality of memory locations for receiving and storing the frames of usable data originating either from the computer (Host) or from the network via the dual port memory while the second microprocessor provides said frames with the control information specific to each communication layer using the communication code.

4. The system for transmission according to claim 1, wherein the third microprocessor (CPU$_4$) is connected via an internal bus (BI$_4$) to an associated erasable read-only memory (PROM$_4$) which contains test and initialization programs for both the second microprocessor and the third microprocessor.

5. The system for transmission according to claim 2, wherein the third microprocessor (CPU$_4$) is connected via an internal bus (BI$_4$) to an associated erasable read-only memory (PROM$_4$) which contains test and initialization programs for both the second microprocessor and the third microprocessor.

6. The system for transmission according to claim 3, wherein the third microprocessor (CPU$_4$) is connected via an internal bus (BI$_4$) to an associated erasable read-only memory (PROM$_4$) which contains test and initialization programs for both the second microprocessor and the third microprocessor.

7. The system for transmission according to claim 4, further comprising a fourth memory (SRAM$_4$) associated with the third microprocessor, upon initialization of said third microprocessor, said third microprocessor transferring the test and initialization programs for the third microprocessor from the erasable read-only memory (PROM$_4$) into the fourth memory (SRAM$_4$) while concurrently transferring the test and initialization program for the second microprocessor from the erasable read-only memory (PROM$_4$) into the second memory (SRAM$_3$).

8. The system for transmission according to claim 5, further comprising a fourth memory (SRAM$_4$) associated with the third microprocessor, upon initialization of said third microprocessor, said third microprocessor transferring the test and initialization programs for the third microprocessor from the erasable read-only memory (PROM$_4$) into the fourth memory (SRAM$_4$) while concurrently transferring the test and initialization program for the second microprocessor from the erasable read-only memory (PROM$_4$) into the second memory (SRAM$_3$).

9. The system for transmission according to claim 6, further comprising a fourth memory (SRAM$_4$) associated with the third microprocessor, upon initialization of said third microprocessor, said third microprocessor transferring the test and initialization programs for the third microprocessor from the erasable read-only memory (PROM$_4$) into the fourth memory (SRAM$_4$) while concurrently transferring the test and initialization program for the second microprocessor from the erasable read-only memory (PROM$_4$) into the second memory (SRAM$_3$).

10. The system according to claim 7, wherein said first and third microprocessors (CPU$_1$, CPU$_4$) command their own respective internal buses, (BI$_1$, BI$_4$), and further wherein an arbitration device serially placed in the internal bus (BI$_3$) of the second microprocessor grants the access of said internal bus (BI$_3$) of the second microprocessor to one of the first, third or the second processor according to an assigned priority order in which the priority of the first microprocessor is the highest and the priority of the second microprocessor is the lowest, and grants the access of the internal bus (BI$_3$) to the second microprocessor (CPU$_3$) in the absence of an access request from either the first or the third microprocessor.

* * * * *

UNITED STATES PATENT AND TRADEMARK OFFICE
CERTIFICATE OF CORRECTION

PATENT NO. : 5,642,482
DATED : June 24, 1997
INVENTOR(S) : Jacky Pardillos

It is certified that an error appears in the above-identified patent and that said Letters Patent is hereby corrected as shown below:

Column 9, line 28, (Claim 1), delete "$(BI_1$" and insert: -- $(BI_1)$ --

Signed and Sealed this

Twenty-seventh Day of January, 1998

*Attest:*

BRUCE LEHMAN

*Attesting Officer*   *Commissioner of Patents and Trademarks*